United States Patent [19]

Dillon

[11] Patent Number: 5,659,615
[45] Date of Patent: Aug. 19, 1997

[54] SECURE SATELLITE RECEIVE-ONLY LOCAL AREA NETWORK WITH ADDRESS FILTER

[75] Inventor: Douglas M. Dillon, Gaithersburg, Md.

[73] Assignee: Hughes Electronics, Los Angeles, Calif.

[21] Appl. No.: 340,348

[22] Filed: Nov. 14, 1994

[51] Int. Cl.$^6$ .................................................. H04K 1/00
[52] U.S. Cl. ................................. 380/21; 380/48; 380/49; 364/242.95; 340/825.34
[58] Field of Search ............................ 380/21, 48, 49; 364/242.95; 340/825.34

[56] References Cited

U.S. PATENT DOCUMENTS

| | | |
|---|---|---|
| 5,117,458 | 5/1992 | Takaragi et al. ............................ 380/4 |
| 5,218,638 | 6/1993 | Matsumoto et al. ...................... 380/23 |
| 5,247,575 | 9/1993 | Sprague et al. ............................ 380/9 |
| 5,485,464 | 1/1996 | Strodbeck et al. ...................... 370/95.2 |

*Primary Examiner*—David C. Cain
*Attorney, Agent, or Firm*—John T. Whelan; Wanda Denson-Low

[57] ABSTRACT

A receiver is connected to a satellite communication network. The receiver includes a satellite receiver card for receiving a packet containing data from the satellite communication network and a satellite receive device driver, associated with the satellite receiver card, for outputting the data in the packet in a format using a predetermined standard LAN interface format. The receiver may also include a key distribution unit for providing the satellite receiver card with keys for decrypting the data in the packet when the data is encrypted. The satellite receive device driver sends the satellite receiver card a list of addresses corresponding to destination addresses of interest, and the satellite receiver card discards the received packet if its destination address is not in the list of addresses.

2 Claims, 2 Drawing Sheets

SECURE SATELLITE RECEIVE-ONLY LOCAL AREA NETWORK WITH ADDRESS FILTER

BACKGROUND OF THE INVENTION

This application relates to a computer network and, more specifically, to a method and apparatus that allows a satellite network to connect to a conventional local area network (LAN).

In conventional satellite communication networks a hub station sends signals to a satellite and then to a receiver on the ground. The receiver is usually specially adapted to receive the satellite signal and the signal is formatted using proprietary packet formats. The satellite signal is designed to be received by a plurality of receivers. In some conventional systems, the data is encrypted using a key known to all of the plurality of receivers.

A disadvantage of such conventional systems lies in the fact that the receiver is specialized and it is difficult to connect the receiver to a conventional LAN. It would be desirable for the receiver to include a conventional computer that can be connected to a standard LAN. Moreover, it is desirable for the hub station to be able to send data to either an individual receiver or to all receivers. In addition, it would be desirable to encrypt the data so that only one of the plurality of receivers could decrypt it.

SUMMARY OF THE INVENTION

The present invention overcomes the problems and disadvantages of the prior art by sending data in a format used by conventional LAN systems to a personal computer connected to the LAN. The data can be addressed to all of a plurality of receivers or to a single receiver. In addition, the data can be encrypted in a manner that enables only certain receivers to decrypt it.

In accordance with the purpose of the invention, as embodied and broadly described herein, the invention resides in a receiver connected to a satellite communication network, comprising: a satellite receiver card for receiving a packet containing data from the satellite communication network; and a satellite receive device driver, associated with the satellite receiver card, for outputting the data in the packet in a format using a predetermined standard LAN interface format.

In another aspect, the receiver further includes a key distribution unit for providing the satellite receiver card with keys for decrypting the data in the packet when the data is encrypted.

In yet another aspect, the satellite receive device driver sends the satellite receiver card a list of addresses corresponding to destination addresses of interest, and the satellite receiver card discards the received packet if its destination address is not in the list of addresses.

In still another aspect, the invention resides in a method of receiving information in a satellite communication network including the steps of: receiving a packet of information transmitted from a satellite, the packet including data; and outputting the data in the packet in a format using a predetermined standard LAN interface format.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are incorporated in and constitute a part of this specification, illustrate several embodiments of the invention and, together with the description, serve to explain the principles of the invention.

DETAILED DESCRIPTION OF THE PREFERRED EMBODIMENTS

Reference will now be made in detail to the preferred embodiments of the invention, examples of which are illustrated in the accompanying drawings. Wherever possible, the same reference numbers will be used throughout the drawings to refer to the same or like parts.

Figure 1:
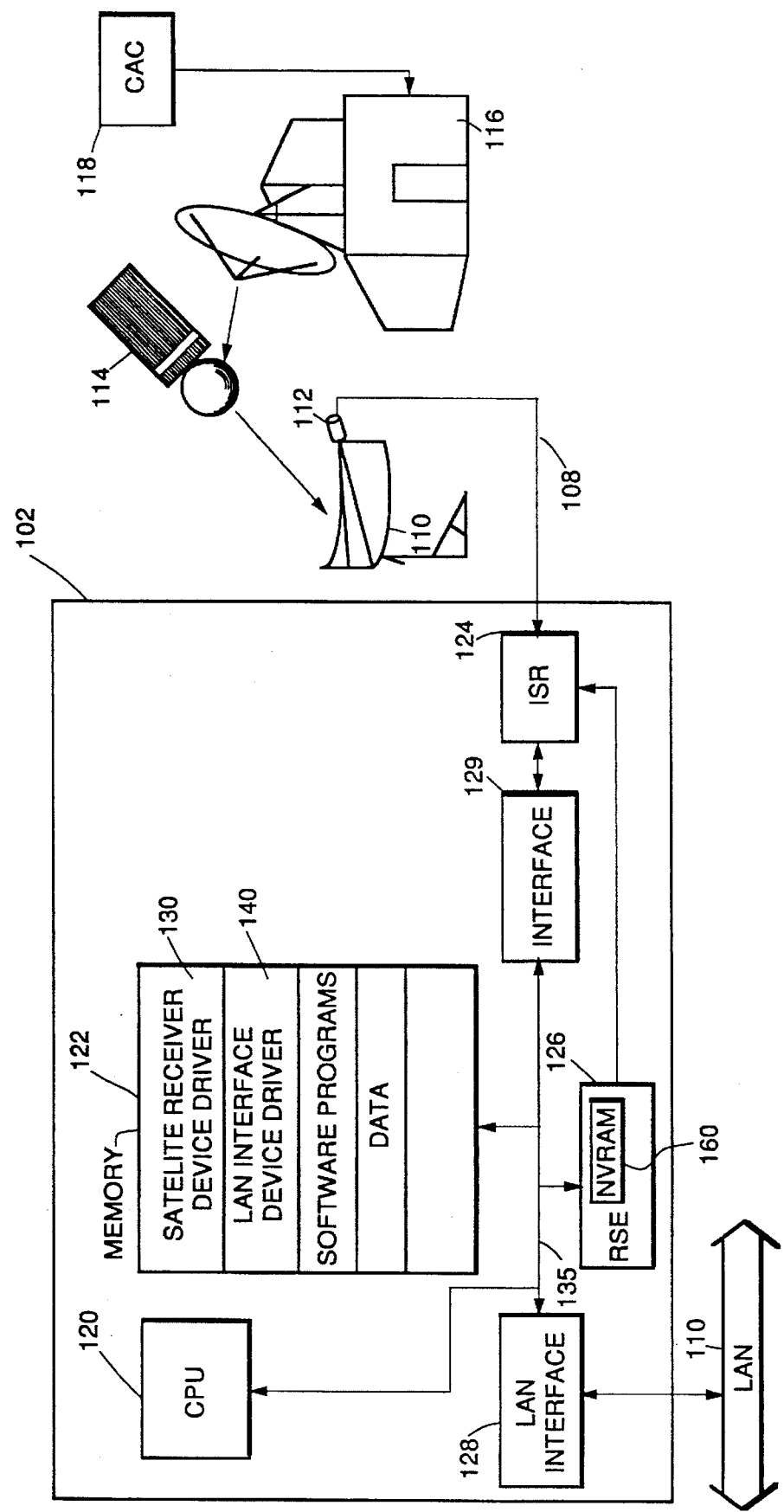
FIG. 1 is a hardware block diagram of a preferred embodiment of the invention.

FIG. 1 is a hardware block diagram of a preferred embodiment of the invention connected to a satellite communications network. FIG. 1 illustrates a personal computer 102, an interfacility link (IFL) 108, preferably a coaxial cable, an antenna 110, having an outdoor satellite receiver (OSR) 112, a satellite 114, a hub 116, a conditional access center (CAC) 118, and a local area network (LAN) 150. Personal computer 102 includes a CPU 120, a memory 122, an inside satellite receiver (ISR) 124, a replacable security engine (RSE) 126, a LAN interface 128, and a bus 135 interconnecting the components of the computer 102. CAC 118 also includes a CPU and a memory (not shown).

IFL 108, antenna 110, OSR 112, satellite 114, and hub 116 are all of known types. Hub 116 preferably sends a signal in a Ku-band having approximately a 500 MHz frequency range to satellite 114. The signal preferably is encoded using Binary Phase Shift Keying (BPSK), but could be encoded using other methods. Satellite 114 transmits the signals to the OSR 112 on antenna 110. OSR 112 amplifies and down modulates an entire received transmission preferably to L-band (typically 950 MHz to 1450 MHz) and passes the resulting signal to the ISR 124 via IFL 108. Computer 102 is connected to a conventional keyboard and display screen (not shown) through a known peripheral bus.

The ISR 124 is preferably an adaptor card for receiving a transmission from the OSR 112, processing it, and sending the processed signal to the rest of the computer 102 via the interface 129 and bus 135. The ISR 124 may be implemented as described in copending application "APPARATUS AND METHOD FOR SATELLITE RECEIVER COMPUTER ADAPTOR CARD" by Douglas M. Dillon, filed Nov. 14, 1994, or in any other manner that will meet the requirements of processing and decrypting signals from the OSR 112. The disclosure of this copending application is incorporated herein by reference.

The memory 122 of computer 102 includes data and software programs. The software programs include an indoor satellite receiver driver 130 and a LAN interface driver 140. The CPU 120 executes the software programs stored in the memory 122, including the satellite receiver device driver 130 and the LAN interface device driver 140. The CPU preferably is a 33 MHz or faster Intel 486 microprocessor belonging to the X86 family of microprocessors, manufactured by Intel Corp., although any microprocessor capable of performing the functions described herein can be used.

The RSE 126 is, e.g., a smart card or a DS2252T Secure Microstik manufactured by Dallas Semiconductor. LAN interface 128 can be implemented using any standard LAN interface software or hardware known to those skilled in the art, e.g., Microsoft's NDIS, Novell's ODI, AT&T's LLI, or other conventional network interface formats.

A standard network driver interface 129 is used to pass information between ISR 124 and the rest of computer 102. Network driver interface 129 also uses one of, e.g., Microsoft's NDIS, Novell's ODI, AT&T's LLI, or other conventional network interface formats. Interface 134 passes information between the ISR device driver 130 and ISR 124. The ISR 124 acts to accept data from the hub 116, through the satellite 114 and OSR 112, decrypt the data if necessary, and repacketize that data into a standard LAN packet format. Because interface 129 uses standard packet formats, ISR device driver 130 operates with any application program designed to connect to a standard LAN. The invention's use of a standard LAN packet format and a standard device driver interface allows off-the-shelf LAN based application programs to be used for receive-only satellite communications. It also allows custom software to be more easily developed because programmers may write software to work with familiar interfaces. Although in this embodiment the LAN interface 128 is shown as separate from the ISR 124, it is understood that the two could both be placed on a single adaptor card.

Figure 2:
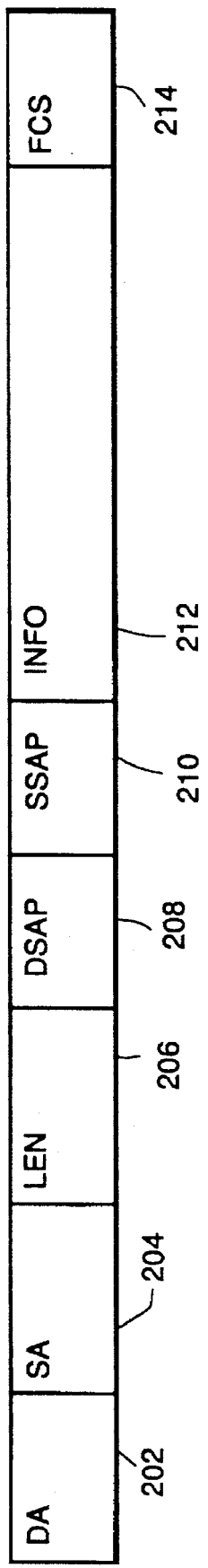
FIG. 2 shows a format of a data packet used in a preferred embodiment of the invention.

FIG. 2 shows a format of a data packet 200 used in a preferred embodiment of the invention for transmission from the hub 116 to the ISR 124 via the satellite 114, and OSR 110. Data packet 200 conforms to the IEEE 802.2 LAN packet standard. Data packet 200 is transmitted over IFL 108 and received by the ISR 124 in the personal computer 102. Data packet 200 includes a destination address (DA) field 202, a source address (SA) field 204, a length (LEN) field 206, a destination service access point (DSAP) field 208, a source service access point (SSAP) field 210, an information field 212 and a frame check sequence (FCS) field 214. The DSAP field 208 serves to identify the transmitted data packet to the receiver. The FCS field 214 is a 32 bit CRC value to aid in identifying erroneous packets. The IEEE 802.2 standard is well known by those skilled in the art.

Figure 3:
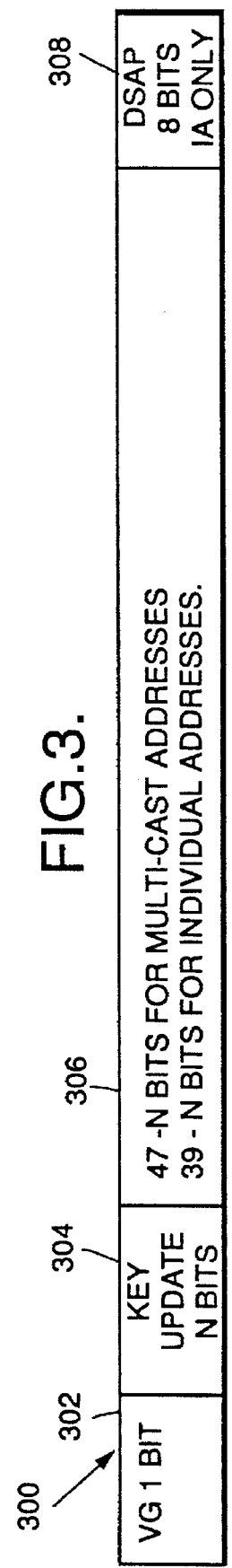
FIG. 3 shows a format of a destination address field of the data packet of FIG. 2.

FIG. 3 shows a format of a destination address field 300 of the data packet of FIG. 2 when the packet is encrypted. Field 300 includes an individual/group (I/G) flag field 302 indicating whether the address is an address of multiple receivers or an individual address, key update bits 304 which tell the RSE 126 what key seed to use in decrypting the packet, and a destination address field 306. Field 300 also includes a DSAP value field 308 that duplicates the value in the DSAP field 208.

Figure 4:
FIG. 4 shows another format of a destination address field of the data packet of FIG. 2.

FIG. 4 shows another format of a destination address field 400 of the data packet of FIG. 2 when the packet is not encrypted. Field 400 also includes an individual/group (I/G) flag field 402 indicating whether the address is a multicast address or an individual address, and a destination address field 406. Field 400 also includes a DSAP value field 408 that duplicates the value in the DSAP field 208.

The ISR 124 includes hardware that checks the duplicate DSAP bit 308/408 and determines whether the personal computer 102 is to receive an incoming packet. Thus, only the destination address field 300/400 need be checked and the checking can be done in hardware when making a determination as to whether to receive or discard a packet.

The packets sent by the hub 116 are encrypted using a symmetric encryption standard, such as the Data Encryption Standard (DES), as set forth in Federal Standard 10-26, as shown in *Telecommunications: Compatibility Requirements for Use of Data Encryption Standards*, published Dec. 11, 1978 by the General Services Administration. Other embodiments may send some or all packets using a private key encryption standard. Hub 116 encrypts information field 212 of each packet using a key that is unique to that packet's destination address. Each possible destination has a memory storing a corresponding encryption key.

The decryption of the incoming packets performed by the computer 102 is preferably performed as follows. The ISR 124 receives and decrypts the packets. RSE 126 provides the ISR 124 only those keys corresponding to addresses that the hardware is authorized to receive. The ISR 124 discards a packet when it does not have the key required to decrypt that packet.

An application program stored in memory 122 indicates which DSAPs and which multicast addresses the application wishes to receive using the convention established by interface 129. ISR device driver 130 combines the set of DSAPs of interest to all the application programs with the ISR hardware's individual address to produce a set of individual addresses of interest to the software. The ISR device driver 130 also combines each application program's set of multicast addresses to produce the set of multicast addresses of interest to the software. The combination of the list of individual addresses of interest and the list of multicast addresses of interest constitutes the entire list of addresses of interest to software. The ISR device driver 130 informs the ISR 124 which addresses it is interested in by loading this entire list of addresses of interest into the receive hardware.

The ISR 124 examines the destination address of each packet and discards a packet unless the receive hardware has both been notified that the packet's destination is of interest to the software and has received the key for the packet's destination address from RSE 126. The RSE 126 only provides the ISR 124 with a multicast address's key if the receiver is authorized to receive that multicast address. The RSE 126 only provides the receive hardware with the key for an individual address with embedded DSAP if the address is the receiver's individual address and if the receiver is authorized to receive the DSAP.

The RSE 126 encapsulates all of the information and processing critical to the security of the system into a single, inexpensive, but physically secure unit. The RSE 126 is designed so that, should the security of the system be attacked and breached, security can be restored by providing each receiver with a new RSE 126 using a revised key distribution algorithm that is resistant to earlier attacks.

The RSE 126 receives information from the ISR device driver 130, e.g., the list of addresses of interest, and provides keys to the ISR 124.

The RSE 126 contains a physically secure, nonvolatile, random access memory (NVRAM) 160. The NVRAM 160 contains the individual address of its associated satellite receiver, a private key, a null key, and a key update address. The individual address has the DSAP that is used to carry key distribution packets embedded in it. The private key is used to decrypt key distribution packets sent individually to the RSE 126. The null key is a key upon which no security depends, which is used to encrypt key distribution packets. No security may depend on this key because the resulting data is passed in the clear from the ISR device driver 130 into the RSE 126. The key update address is a multicast address which is used to periodically send key update messages to RSEs.

The CAC 118 periodically transmits to each RSE 126, at their individual address, key distribution packets containing secure data for the RSE 126. This secure data is double encrypted using both the RSE's private key and the null key. The secure data contains two seed sets, identified by sequence number, where each seed set has an entry for each of the addresses the replacable security engine's ISR 124 is authorized to receive. The existence of two seed sets facilitates the frequent changing of keys. The address in a seed set can be either a multicast address or an individual address with embedded DSAP.

Each seed set entry contains an address the ISR 124 is authorized to receive and a key seed. The key seed is used as the key to a keyed one-way hashing function that is used together with the contents of key update packets to generate keys for the address. Keyed one-way hashing functions are well known in the computer art.

Key update packets are periodically broadcast by the CAC 118 to the RSE 126 to allow the keys to be changed frequently. Each key packet contains a current key sequence number, a next key sequence number, a current seed set sequence number, a next seed set sequence number, a current key vector and a next key vector. The hub indicates that it is beginning a key update by sending out a key update packet in which the next key sequence number is one greater than the current key sequence number. This warns the RSE 126 to create and load the keys based on the pieces of data in the key update packet and the previously transmitted seed sets.

The key update message is very short, which allows the hub to send frequent key updates without significantly increasing the overhead of the system.

The combination of the key update packet with the secure database allows the RSE to generate keys for any of the addresses the computer 102 is authorized to receive and only for those addresses that the computer 102 is authorized to receive. The set of authorized addresses can be modified by sending a revised database to the receiver whose next seed set incorporates the changes. When the hub 116 switches to that seed set, the computer 102 loses access to any addresses that it is no longer authorized to receive and obtains access to any addresses that it has newly been authorized to receive.

At system startup RSE 126 loads the null key for the individual address into the satellite receive hardware and the null key for the key update address. This allows the ISR device driver 130 to receive and decrypt key distribution packets and key update packets, using the null key. The ISR device driver 130 relays these packets to the RSE 126. The key distribution packets received by the RSE 126 are encrypted using the RSE's private key. Thus, the key seeds contained in the key distribution packets do not appear "in the clear," i.e., unencrypted, outside of the RSE 126. The key update messages appear "in the clear" but are not sufficient by themselves or with the keys from a keyed one-way function to allow the key seeds to be obtained.

In order to change the keys quickly, individual packets are tagged to contain the sequence number of the key under which they are encrypted. FIG. 3 shows the preferred format of the destination address 300 with an N-bit key update field 304. The destination address also includes an I/G bit 302 indicating whether the following address is an individual address (I) or a group (G), i.e., multicast, address, and either a 39 bit individual address or a 47 bit multicast address 306, depending upon the value of the I/G bit 302. If the address 306 is an individual address, an 8 bit DSAP 308 is added to the end of the individual address. By repeating the DSAP within the destination address, the ISR 124 need only look at the destination address to determine whether to receive or discard a packet.

Every time the hub changes keys it increments the key update field modulo 2**N. For each requested address the application wishes to receive, the RSE 126 passes to the ISR 124 two addresses and two keys, as a pair of address/key combinations. One of the address/key combinations corresponds to the current key and the other combination either corresponds to the previous key (current sequence number −1) or the next key (current sequence number +1).

One of these two key/address combinations will provide the current key for the received address. Prior to the change of keys by the hub 116, one key/address combination will contain the current key and the other will contain the next key, i.e., the key corresponding to the current sequence number plus 1. After the change of keys by the hub 116, one key/address combination will contain the current key and the other will contain the previous key, i.e., the key corresponding to the current sequence number minus 1.

The hub 116 broadcasts a key update packet to the RSE 126 shortly before the hub 116 switches keys. This allows the RSE 126 to create and load the next keys shortly before the hub switches to using those new keys. By sending the update message to the RSE 126 prior to the switching of the keys, the hub 116 ensures that the ISR 124 is ready when the hub switches. By sending the update message only shortly before it is needed, the hub 116 ensures that the update message cannot be easily intercepted and relayed for use by unauthorized receivers. This allows the system to change the keys frequently and allow only an authorized receiver access to the keys.

Other embodiments will be apparent to those skilled in the art from consideration of the specification and practice of the invention disclosed herein. It is intended that the specification and examples be considered as exemplary only, with a true scope of the invention being indicated by the following claims.

What is claimed is:

1. A receiver connected to a satellite communication network, comprising:

a satellite receiver card for receiving a data packet from the satellite communication network, each data packet comprising at least (1) a destination address field for identifying the destination of the data packet, (2) a destination service access point field for identifying the transmitted data packet to the satellite receiver card, and (3) key update bit;

a key distribution unit for providing the satellite receiver card with keys for decrypting the data in the packet when the data is encrypted, said keys being selected as a function of the key update bits such that the satellite receiver card is provided with a decrypting key only if the satellite receiver card is authorized to receive a data packet identified by a particular destination service access point; and a satellite receive device driver, associated with the satellite receiver card, for outputting the data packet in a format using a predetermined standard local area network interface format.

2. A method of receiving information in a satellite communication network including the steps of:

receiving at least one data packet of information transmitted from a satellite, each data packet comprising at least (1) a destination address field for identifying the destination of the data packet, (2) a destination service access point field for identifying the transmitted data packet, and (3) key update bits;

providing keys for decrypting the data in the packet when the data is encrypted, said keys being selected as a function of the key update bits such that a decrypting key is provided only if there is authorization to receive a data packet identified by a particular destination service access point; and outputting the data packet in a format using a predetermined standard local area network interface format.

* * * * *